US011945527B2

(12) United States Patent
Han et al.

(10) Patent No.: US 11,945,527 B2
(45) Date of Patent: Apr. 2, 2024

(54) PLANETARY WHEEL TYPE OBSTACLE CROSSING ROBOT

(71) Applicant: HUAZHONG UNIVERSITY OF SCIENCE AND TECHNOLOGY, Hubei (CN)

(72) Inventors: Bin Han, Hubei (CN); Xuedong Chen, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 355 days.

(21) Appl. No.: 17/359,671

(22) Filed: Jun. 28, 2021

(65) Prior Publication Data

US 2022/0402567 A1 Dec. 22, 2022

(30) Foreign Application Priority Data

Jun. 16, 2021 (CN) .......................... 202110668430.0

(51) Int. Cl.
*B62D 57/028* (2006.01)
*B62D 57/02* (2006.01)

(52) U.S. Cl.
CPC ......... *B62D 57/028* (2013.01); *B62D 57/022* (2013.01)

(58) Field of Classification Search
CPC .......... A61G 5/06; A61G 5/061; A61G 5/065; A61G 5/063; B60B 11/02; B60B 11/04;
(Continued)

(56) References Cited

U.S. PATENT DOCUMENTS 2,931,449 A * 4/1960 King ...................... A61G 5/065
180/907
3,348,518 A * 10/1967 Forsyth .................... B63H 1/34
180/9.1
(Continued)

FOREIGN PATENT DOCUMENTS

CN 104890752 3/2017
CN 106892014 6/2017
(Continued)

OTHER PUBLICATIONS

Machine translation of CN 110228513 A to Hu et al.(Year: 2019).*

*Primary Examiner* — Minnah L Seoh
*Assistant Examiner* — Christopher B Wehrly
(74) *Attorney, Agent, or Firm* — JCIP GLOBAL INC.

(57) ABSTRACT

A planetary wheel type obstacle crossing robot, including a frame, a front drive set, and a rear drive set, is provided. The front drive set and the rear drive set are respectively connected to a front end and a rear end of the frame. The front drive set includes a dual-drive steering wheel structure, which includes two drive wheels and two first drive devices. The first drive devices respectively output different rotational speeds to the drive wheels, so that the dual-drive steering wheel structure rotates. The rear drive set includes two planetary wheel sets, two second drive devices, and a planetary wheel set suspension structure. Each planetary wheel set is individually driven and includes a front wheel, a rear wheel, and an upper wheel. The wheels of each planetary wheel set cooperate to climb over an obstacle under an action of a driving torque output by the second drive device.

11 Claims, 4 Drawing Sheets

(58) Field of Classification Search
CPC ......... B60B 19/00; B60B 19/12; B62B 5/026;
B62D 57/022; B62D 57/028; B62D 61/12
USPC .......................... 180/8.3; 280/5.26, DIG. 10
See application file for complete search history.

(56) References Cited

U.S. PATENT DOCUMENTS

| | | | | |
|---|---|---|---|---|
| 3,580,344 | A * | 5/1971 | Floyd | A61G 5/065 |
| | | | | 180/8.2 |
| 3,730,287 | A * | 5/1973 | Fletcher | B62D 55/247 |
| | | | | 180/41 |
| 4,200,161 | A * | 4/1980 | Penington, Jr. | B62D 57/00 |
| | | | | 180/8.2 |
| 4,790,548 | A * | 12/1988 | Decelles | A61G 5/061 |
| | | | | 180/8.2 |
| 4,993,912 | A * | 2/1991 | King | B62D 61/12 |
| | | | | 89/929 |
| 5,579,857 | A * | 12/1996 | Abe | A61G 5/061 |
| | | | | 180/907 |
| 5,971,091 | A * | 10/1999 | Kamen | A61G 5/04 |
| | | | | 700/71 |
| 5,975,225 | A * | 11/1999 | Kamen | A61G 5/068 |
| | | | | 180/21 |
| 6,484,829 | B1 * | 11/2002 | Cox | B62D 57/028 |
| | | | | 180/8.1 |
| 7,334,850 | B2 * | 2/2008 | Spector | A61G 5/061 |
| | | | | 305/60 |
| 8,260,459 | B2 * | 9/2012 | Herbert | B62D 57/02 |
| | | | | 700/245 |
| 8,393,420 | B2 * | 3/2013 | Kim | B62B 5/026 |
| | | | | 180/8.2 |
| 9,726,268 | B1 * | 8/2017 | Krasowski | A61G 5/065 |
| 9,757,978 | B1 * | 9/2017 | Emigh | B60B 9/28 |
| 9,989,970 | B1 * | 6/2018 | Morey | B62D 57/024 |
| 10,259,481 | B2 * | 4/2019 | Gerhardt | B62H 3/00 |
| 11,623,473 | B2 * | 4/2023 | Fujioka | F16H 57/08 |
| | | | | 301/5.1 |
| 2006/0145433 | A1 * | 7/2006 | Kim | B62D 61/10 |
| | | | | 280/5.28 |
| 2007/0080000 | A1 * | 4/2007 | Tobey | A61G 5/045 |
| | | | | 180/21 |
| 2015/0196439 | A1 * | 7/2015 | Osipov | A61G 5/061 |
| | | | | 180/19.1 |

FOREIGN PATENT DOCUMENTS

| | | | | |
|---|---|---|---|---|
| CN | 106364580 | | 5/2018 | |
| CN | 110182009 | A * | 8/2019 | .......... B60G 15/063 |
| CN | 110228513 | A * | 9/2019 | ............ A61G 5/061 |
| CN | 109484165 | | 2/2020 | |

* cited by examiner

PLANETARY WHEEL TYPE OBSTACLE CROSSING ROBOT

CROSS-REFERENCE TO RELATED APPLICATION

This application claims the priority benefit of China application serial no. 202110668430.0, filed on Jun. 16, 2021. The entirety of the above-mentioned patent application is hereby incorporated by reference herein and made a part of this specification.

BACKGROUND

Technical Field

The disclosure relates to the technical field of obstacle crossing robots, and more specifically relates to a planetary wheel type obstacle crossing robot.

Description of Related Art

Obstacle crossing robots have a wide range of applications. The structures of current obstacle crossing robots are mainly wheel type, pedrail type, and leg type. The existing obstacle crossing robots have their respective advantages and disadvantages. The leg type obstacle crossing robot has flexible movement and strong terrain adaptability, but the structure and control thereof are very complicated, and the application thereof is not extensive. The pedrail type obstacle crossing robot has stronger obstacle crossing ability, large support area for the pedrail type mechanism, small subsidence, strong terrain adaptability, and stable operation. However, the pedrail type mechanism is large in size, bulkier, has poor turning characteristics, and causes large damage to the road surface. The wheel type obstacle crossing robot has a larger structure, a high load-to-weight ratio, and can implement both balanced and fast movement when traveling on a flat road surface with a load. Generally, the planetary wheel type is adopted. However, since two wheels of the planetary wheel set are on the ground during normal operation, the turning characteristics of the obstacle crossing robot are greatly reduced, and when turning, the wear of the planetary wheel set is greater due to the two wheels being on the ground.

At present, persons skilled in the art have done some research. For example, the patent document CN205632713U discloses an active planetary wheel system obstacle crossing robot chassis, which adopts four direct current motor full-drive planetary wheel system mode. Four planetary wheel drive sets are fixed relative to a frame. During normal operation, two wheels of the planetary wheel set are on the ground, which has poor turning characteristics and greater wear of the wheels. Therefore, in the art, a planetary wheel type obstacle crossing robot with better turning characteristics needs to be developed, so that the robot has excellent obstacle crossing performance and turning characteristics at the same time, and the wear of the wheels is reduced.

SUMMARY

The disclosure provides a planetary wheel type obstacle crossing robot, which aims to solve the issues of poor turning characteristics and severe wear of existing obstacle crossing robots.

In order to achieve the objectives, the disclosure provides a planetary wheel type obstacle crossing robot, which includes a frame, a front drive set, and a rear drive set.

The front drive set is connected to a front end of the frame. The front drive set includes a dual-drive steering wheel structure. The dual-drive steering wheel structure includes two drive wheels and two first drive devices. The two first drive devices respectively output different rotational speeds to the two drive wheels, so that the dual-drive steering wheel structure is steered to drive the frame and the rear drive set to steer.

The rear drive set is connected to a rear end of the frame. The rear drive set includes two planetary wheel sets, two second drive devices, and a planetary wheel set suspension structure. Each planetary wheel set is individually driven.

Each planetary wheel set includes a front wheel, a rear wheel, and an upper wheel. The three wheels of each planetary wheel set cooperate to climb over an obstacle under an action of a driving torque output by the second drive device, and the two second drive devices respectively control rotational speeds of the two planetary wheel sets to implement steering of the two planetary wheel sets. The two planetary wheel sets are connected through the planetary wheel set suspension structure. The planetary wheel set suspension structure is a retractable parallelogram structure. Two vertical sides of the parallelogram structure are perpendicular to the ground, the other two sides are parallel to the ground, and the other two sides may adapt to a terrain to retract. The two planetary wheel sets are symmetrically connected to the two vertical sides of the parallelogram structure, so that the two planetary wheel sets always remain in a vertical state and adapt to a non-planar terrain.

The obstacle crossing robot is driven by the front drive set and the rear drive set to cross the obstacle and steer.

In an optional example, the front drive set further includes a steering wheel suspension structure.

The dual-drive steering wheel structure is connected to the front end of the frame through the steering wheel suspension structure.

The steering wheel suspension structure includes a drive part fixing plate, a damping spring, and a damping spring bracket.

The dual-drive steering wheel structure further includes a motor fixing base, a drive wheel fixing plate, an outer connecting shaft, a limit sleeve, an inner connecting shaft, and a shaft end retaining ring.

The first drive device is connected to the motor fixing base. A torque output by the first drive device is transmitted to the drive wheel through a belt transmission structure or a chain transmission structure. The drive wheel is connected to an output shaft of the belt transmission structure or the chain transmission structure. The drive wheel fixing plate passes through the output shaft and connects the output shaft and the drive wheel through a bolt to implement fixing in an axial direction of the drive wheel. The outer connecting shaft is connected to the drive part fixing plate through a bolt. The inner connecting shaft passes through the outer connecting shaft. A lower end of the outer connecting shaft is connected to the motor fixing base, and an upper end of the inner connecting shaft is connected to the shaft end retaining ring, thereby implementing relative rotation of the inner connecting shaft and the outer connecting shaft. The limit sleeve passes through the inner connecting shaft. The shaft end retaining ring is screwed onto a thread of the upper end of the inner connecting shaft. The limit sleeve is pressed against the inner connecting shaft to implement axial direction limit. Two ends of the damping spring are respectively pressed against the inner connecting shaft and a lower end of the damping spring bracket. An upper end of the damping spring bracket is connected to the front end of the frame.

Specifically, the damping spring is a shock absorber of the front drive set.

In an optional example, the front drive set has a center-symmetric structure.

In an optional example, the rear drive set further includes a drive support plate.

The two planetary wheel sets are respectively connected to one sides of the two second drive devices.

The other sides of the two second drive devices are respectively connected to two sides of the planetary wheel set suspension structure.

An upper end of the planetary wheel set suspension structure is connected to a lower end of the drive support plate.

An upper end of the drive support plate is connected to the rear end of the frame.

In an optional example, the planetary wheel set suspension structure includes two motor brackets, eight pendulum rods, two connecting rods, a drive bracket, four spring guide rods, four pressure springs, two spacing sleeves, and two support shafts.

The two motor brackets are used to respectively connect to the second drive device.

The two motor brackets are respectively connected to the drive bracket through the four pendulum rods to form the retractable parallelogram structure. The four pendulum rods are respectively composed of two pendulum rods with parallel upper ends and two pendulum rods with parallel lower ends. The connecting rod is connected between the two pendulum rods with parallel lower ends.

An upper end of the pressure spring is pressed against the support shaft, and a lower end is pressed against the connecting rod. The spring guide rod passes through the pressure spring and is connected to the drive bracket through the support shaft. A fork is provided under the spring guide rod, and the connecting rod is placed in the fork. Two sides of the drive bracket respectively have two spring guide rods, two pressure springs, a spacing sleeve, and a support shaft.

The spacing sleeve is sleeved onto the support shaft and is placed between the two spring guide rods on the same side.

When the planetary wheel set encounters an obstacle or a ground with uneven left and right sides, a shape of a parallelogram formed by the motor bracket, the drive bracket, and the pendulum rod changes. The planetary wheel set and the second drive device rely on the pendulum rod to swing together. The connecting rod squeezes the pressure spring to move in the fork under the spring guide rod. At the same time, the spring guide rod rotates around the support shaft, thereby enhancing the terrain adaptability of the obstacle crossing robot.

Specifically, a component composed of the drive bracket, the spacing sleeve, the support shaft, the spring guide rod, the pressure spring, and the connecting rod is a shock absorber of the rear drive set.

In an optional example, each planetary wheel set also includes a binding rod.

The binding rod has three output shafts. Movement directions and movement speeds of the three output shafts are the same. The three output shafts are respectively connected to the front wheel, the rear wheel, and the upper wheel.

A central axis of the upper wheel, a central axis of the front wheel, and a central axis of the rear wheel respectively coincide with central axes of the three output shafts of the binding rod, and structures of the upper wheel, the front wheel, and the rear wheel are the same. A geometric center of the upper wheel, a geometric center of the front wheel, and a geometric center of the rear wheel are respectively located at three vertices of the same equilateral triangle.

In an optional example, when the obstacle crossing robot is traveling normally, the front wheel and the rear wheel of the planetary wheel set are on the ground at the same time, and stable power is provided through the front wheel and the rear wheel.

When the obstacle crossing robot encounters the obstacle, the front wheel is blocked by the obstacle. Under the action of the driving torque output by the second drive device, the binding rod flips forward around the front wheel, so that the upper wheel touches the ground. At this time, if the obstacle has not been passed, the upper wheel is also blocked by the obstacle. Under the action of the driving torque output by the second drive device, the binding rod continues to flip forward around the upper wheel, so that the rear wheel touches the ground. The three wheels flip in turn until the entire planetary wheel set passes the obstacle.

In an optional example, when the obstacle crossing robot encounters a gully, the front wheel is under the action of the driving torque output by the second drive device, and the binding rod flips forward around the front wheel, so that the upper wheel reaches an opposite side of the gully. After the upper wheel contacts a plane on the opposite side of the gully, the upper wheel and the rear wheel jointly drive the planetary wheel set to move horizontally. The front wheel separates from a front wall of the gully. An upward driving force generated by the front wheel contacting the front wall of the deep groove and a driving force generated by the upper wheel jointly act, so that the planetary wheel set makes a combined flipping and forward movement, and the center of gravity gradually rises to complete gully crossing.

In an optional example, the rear drive set has a center-symmetric structure.

Generally speaking, compared with the prior art, the above technical solutions conceived by the disclosure have the following beneficial effects.

The disclosure provides the planetary wheel type obstacle crossing robot. The rear drive set adopts the planetary wheel set structure. When encountering the obstacle, the binding rod drives the planetary wheels to flip, which greatly improves the obstacle crossing ability and has stability. The suspension structure of the rear drive set adopts the retractable parallelogram structure. When passing through the uneven ground, the pendulum rod swings to change the shape of the parallelogram. Under the action of the pressure spring, the planetary wheel set does not hover, and the retractable parallelogram structure can always keep the planetary wheel set in the vertical state. In addition, the pendulum rod has a large swing angle and high flexibility, which can further improve the obstacle crossing performance. The front drive of the disclosure adopts the dual-drive steering wheel structure. The dual-drive steering wheel can implement rotation at any angle, and as compared with the front drive also adopting a planetary wheel type structure, the dual-drive steering wheel has excellent steering characteristics, improves the passing performance of a complex terrain, and reduces the wear of the planetary wheel sets. The front drive set and the rear drive set of the disclosure are both symmetrical structures, so that the planetary wheel type obstacle crossing robot has better balance. The front and rear drive sets of the disclosure are both equipped with the shock absorbers. The shock absorbers are used to reduce the vibration of the vehicle body, which improves the stability of the vehicle body.

BRIEF DESCRIPTION OF THE DRAWINGS

In all the drawings, the same reference numerals are used to denote the same elements or structures.

DETAILED DESCRIPTION OF DISCLOSED EMBODIMENTS

Figure 1:
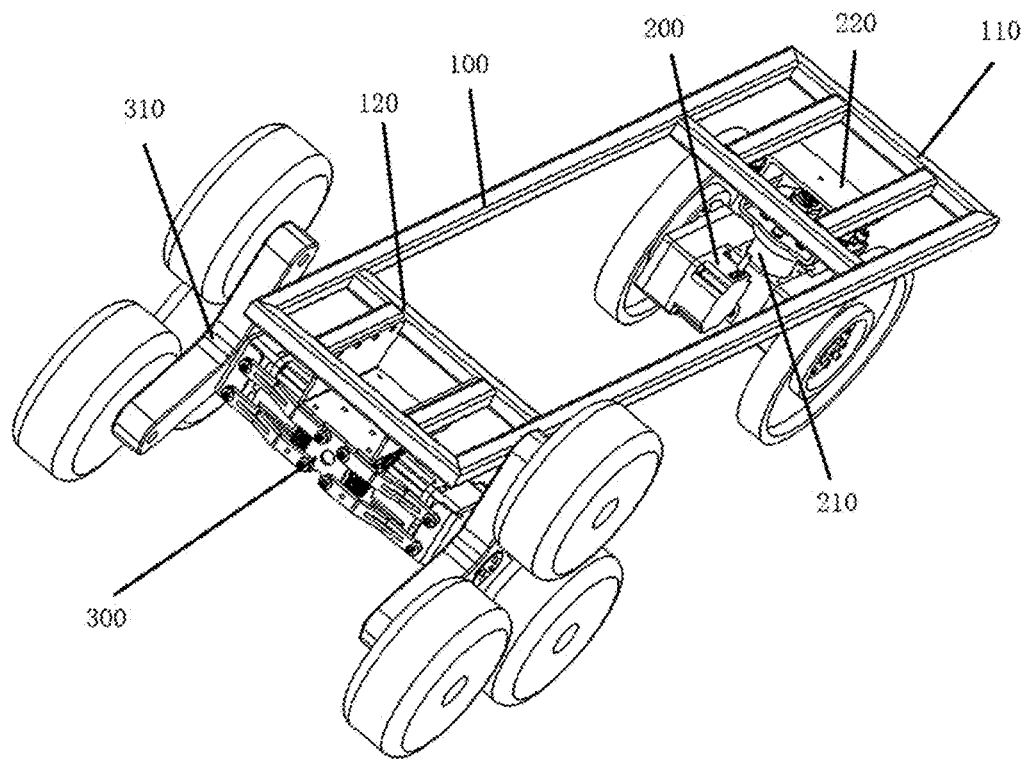
FIG. 1 is a schematic structural diagram of a planetary wheel type obstacle crossing robot according to an embodiment of the disclosure.

In order for the objectives, technical solutions, and advantages of the disclosure to be clearer, the disclosure is further described in detail below in conjunction with the accompanying drawings and embodiments. It should be understood that the specific embodiments described herein are only used to explain the disclosure, but not to limit the disclosure.

In view of the above defects or improvement requirements of the prior art, based on the working characteristics of a planetary wheel type obstacle crossing robot, the disclosure provides a planetary wheel type obstacle crossing robot, which has better turning characteristics. Through perfectly combining the obstacle crossing performance of a planetary wheel and the turning characteristics of a steering wheel, the issue of poor turning characteristics of a planetary wheel type mechanism is solved, and the wear of the planetary wheel is effectively reduced. In addition, the planetary wheel type obstacle crossing robot has a simple structure and stable operation, which is conducive to the popularization and application of the planetary wheel type obstacle crossing robot.

Specifically, the disclosure provides the following technical solutions. A planetary wheel type obstacle crossing robot includes a frame and a front drive set and a rear drive set for supporting the frame.

The front drive set has a dual-drive steering wheel structure. An inner connecting shaft of the dual-drive steering wheel structure is connected to a damping spring bracket through a damping spring. The damping spring bracket is then connected to two middle horizontal beams at a front end of the frame.

The rear drive set is a structure of two independently driven planetary wheel sets. The rear drive set includes two second drive devices, two planetary wheel sets, two motor brackets, eight pendulum rods, a shock absorber, and a drive bracket. The two planetary wheel sets are disposed left and right and are respectively driven by the second drive device. In addition, the second drive device is installed on each motor bracket. Each second drive device is installed with the planetary wheel set. The motor bracket is connected to two sides of the shock absorber through the four pendulum rods. The shock absorber is connected to the frame through a drive support plate.

Preferably, the shock absorber of the rear drive set includes a drive bracket, two spacing sleeves, two support shafts, four spring guide rods, four pressure springs, and two connecting rods. The connecting rod is connected between the two pendulum rods below each side. The spring guide rod passes through the pressure spring. An upper end of the spring guide rod is connected to the drive bracket through the support shaft, and a lower end is opened with a fork placed on the connecting rod. The spring guide rod and the pressure spring are distributed at four corners of the drive bracket.

Preferably, the pendulum rods are parallel to each other, and form a parallelogram structure with the motor bracket and the drive bracket.

Preferably, the front drive set and the rear drive set have symmetrical structures. A structure of a left drive device is the same as a structure of a right drive device.

Preferably, the rear drive set implements differential drive of the planetary wheel set through a differential. The drive device is connected to the differential. An output rotational speed of the drive device differentially drives the planetary wheel sets on two sides through the differential.

Please refer to FIG. 1 to FIG. 5. A planetary wheel type obstacle crossing robot according to a preferred embodiment of the disclosure not only has excellent obstacle crossing performance, but also has excellent turning characteristics, which can effectively reduce the wear of planetary wheels and can be widely applied in a structure similar to a stretcher transporter.

FIG. 1 is a schematic structural diagram of a planetary wheel type obstacle crossing robot according to an embodiment of the disclosure. As shown in FIG. 1, the planetary wheel type obstacle crossing robot according to the disclosure includes a frame 100, a front drive set structure 200, and a rear drive set structure 300.

The frame 100 includes a frame front end structure 110 and a frame rear end structure 120. The front drive set structure 200 and the rear drive set structure 300 are respectively connected to the frame front end structure 110 and the frame rear end structure 120.

In addition, the front drive set structure 200 includes a steering wheel drive structure 210 and a steering wheel suspension structure 220. The steering wheel drive structure 210 is connected to the steering wheel suspension structure 220. Two sides of the steering wheel suspension structure 220 are respectively connected to a front end left horizontal beam and a front end right horizontal beam.

The rear drive set structure 300 includes a planetary wheel set structure 310.

Figure 2:
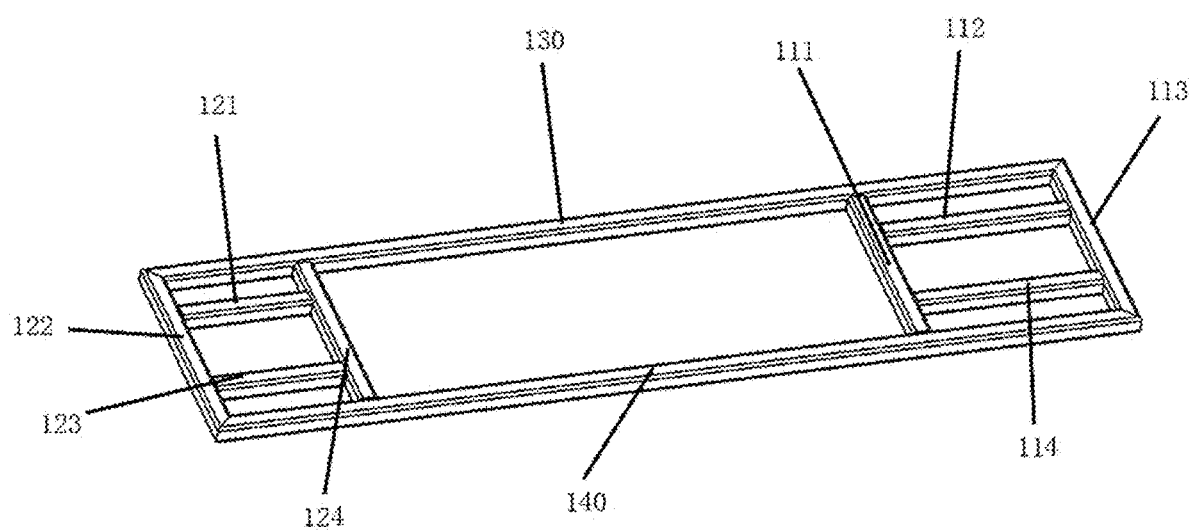
FIG. 2 is a schematic structural diagram of a frame according to an embodiment of the disclosure.

FIG. 2 is a schematic structural diagram of a frame according to an embodiment of the disclosure. As shown in FIG. 2, the frame 100 further includes a left horizontal beam 130 and a right horizontal beam 140. The left horizontal beam 130 and the right horizontal beam 140 are respectively connected to two sides of the frame front end structure 110 and the frame rear end structure 120. The frame front end structure 110 includes a front end inner vertical beam 111, a front end left horizontal beam 112, a front end outer vertical beam 113, and a front end right horizontal beam 114. The front end inner vertical beam 111 and the front end outer vertical beam 113 are both parallelly connected to the left horizontal beam 130 and the right horizontal beam 140. The front end left horizontal beam 112 and the front end right horizontal beam 114 are both parallelly connected to the front end inner vertical beam 111 and the front end outer vertical beam 113. The frame rear end structure 120 includes a rear end left horizontal beam 121, a rear end outer vertical beam 122, a rear end right horizontal beam 123, and a rear end inner vertical beam 124. The rear end inner vertical beam 124 and the rear end outer vertical beam 122 are both parallelly connected to the left horizontal beam 130 and the right horizontal beam 140. The rear end left horizontal beam 121 and the rear end right horizontal beam 123 are both parallelly connected to the rear end inner vertical beam 124 and the rear end outer vertical beam 122. In the embodiment, the frame front end structure 110 and the frame rear end structure 120 are basically rectangular frames with crossbeams. It is understood that in other embodiments, the frame 100 may have other shapes, such as a trapezoid.

Figure 3:
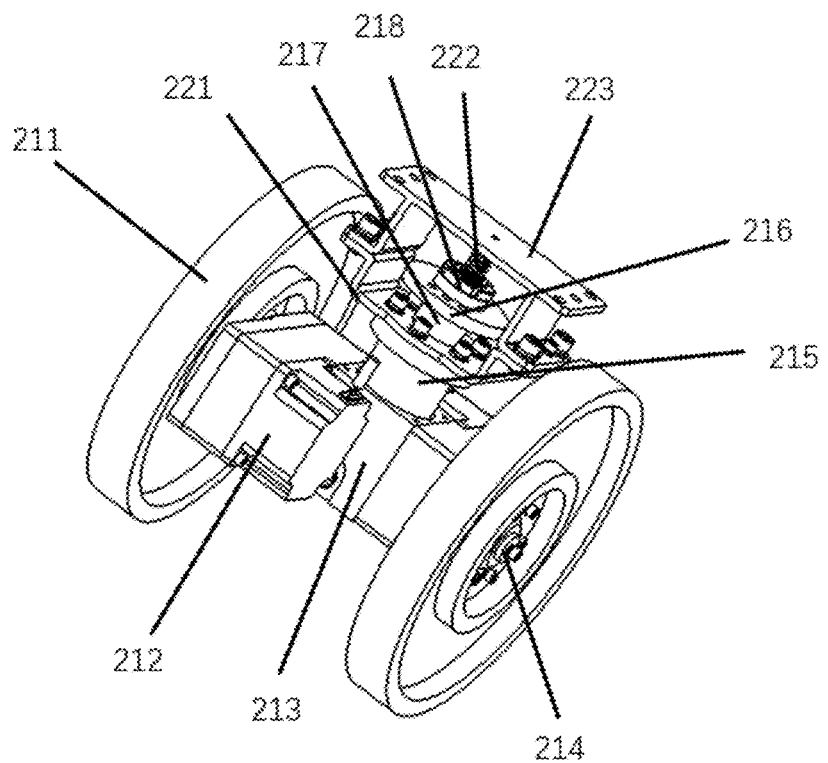
FIG. 3 is a schematic structural diagram of a front drive set according to an embodiment of the disclosure.

FIG. 3 is a schematic structural diagram of a front drive set according to an embodiment of the disclosure. As shown in FIG. 3, the steering wheel drive structure 210 includes two drive wheels 211, two first drive devices 212, two motor fixing bases 213, a drive wheel fixing plate 214, an outer connecting shaft 215, a limit sleeve 216, an inner connecting shaft 217, and a shaft end retaining ring 218. The steering wheel suspension structure 220 includes a drive part fixing plate 221, a damping spring 222, and a damping spring bracket 223.

Each first drive device 212 is connected to the motor fixing base 213. In order to reduce space, a torque output by each first drive device 212 is transmitted to the drive wheel 211 through a belt transmission structure or a chain transmission structure. Each first drive device 212 individually drives the drive wheel 211. The drive wheel 211 is connected to an output shaft of the belt transmission structure or the chain transmission structure. The drive wheel fixing plate 214 is used to position in an axial direction of the drive wheel 211 and is fixed to the drive wheel 211 through a bolt passing through the output shaft. The outer connecting shaft 215 is connected to the drive part fixing plate 221 through a bolt. A lower end of the inner connecting shaft 217 is connected to the motor fixing base 213, and an upper end of the inner connecting shaft 217 is connected to the shaft end retaining ring 218. The limit sleeve 216 passes through the inner connecting shaft 217 and is pressed against the inner connecting shaft 217 by the shaft end retaining ring 218 to implement axial direction limit. Two ends of the damping spring 222 are respectively pressed against the inner connecting shaft 217 and the damping spring bracket 223.

The front drive set structure 200 is a dual-drive steering wheel structure with a center-symmetric structure. The two first drive devices 212 respectively output different rotational speeds to the two drive wheels 211 to implement steering and have excellent steering characteristics.

Figure 4:
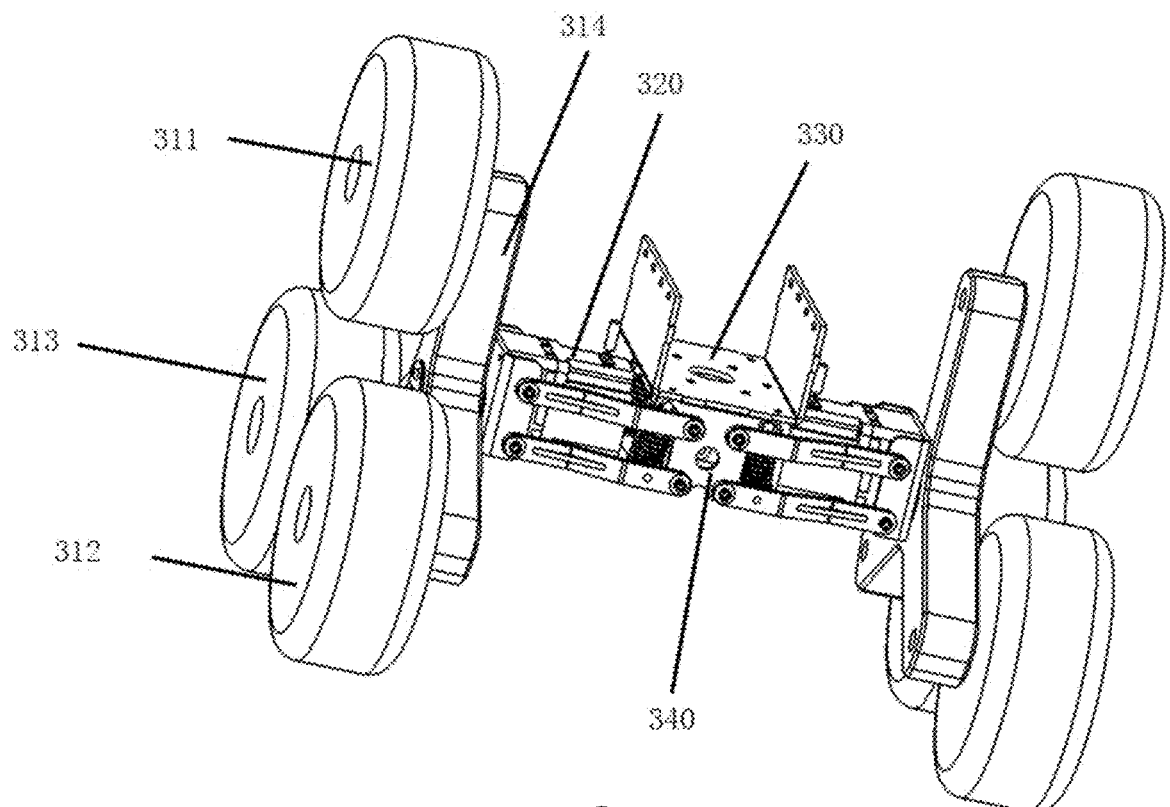
FIG. 4 is a schematic structural diagram of a rear drive set according to an embodiment of the disclosure.

FIG. 4 is a schematic structural diagram of a rear drive set according to an embodiment of the disclosure. As shown in FIG. 4, the rear drive set structure 300 further includes two second drive devices 320, a drive support plate 330, and a planetary wheel set suspension structure 340.

Each planetary wheel set structure 310 is connected to the second drive device 320. The second drive device 320 provides force to the planetary wheel set structure 310. The two second drive devices 320 are connected to the planetary wheel set suspension structure 340. The planetary wheel set suspension structure 340 is connected to the drive support plate 330. Two sides of the drive support plate 330 are respectively connected to the frame rear end left horizontal beam 121 and the frame rear end right horizontal beam 123. There is a boss structure on a side wall of the drive support plate 330, which can share a load.

The rear drive set 300 has a symmetrical structure, and left and right sides have the same structure. Through controlling output rotational speeds of the two second drive devices 320, steering is implemented. In addition, differential may also be controlled through a differential, thereby implementing steering. Specifically, the second drive device is connected to the differential. Two sides of the differential are connected to the planetary wheel set. The second drive device inputs movement to the differential. When turning, the differential distributes rotational speeds on two sides, thereby outputting to the planetary wheel set to implement differential turning.

As shown in FIG. 4, the planetary wheel structure 310 includes an upper wheel 311, a front wheel 312, a rear wheel 313, and a binding rod 314. Movement directions and speeds of three output shafts of the binding rod 314 are the same, and the three output shafts of the binding rod 314 are respectively connected to the upper wheel 311, the front wheel 312, and the rear wheel 313. A central axis of the upper wheel 311, a central axis of the front wheel 312, and a central axis of the rear wheel 313 respectively coincide with central axes of the three output shafts of the binding rod 314. A structure of the upper wheel 311, a structure of the front wheel 312, and a structure of the rear wheel 313 are the same. A geometric center of the upper wheel 311, a geometric center of the front wheel 312, and a geometric center of the rear wheel 313 are respectively located at three vertices of the same equilateral triangle.

Figure 5:
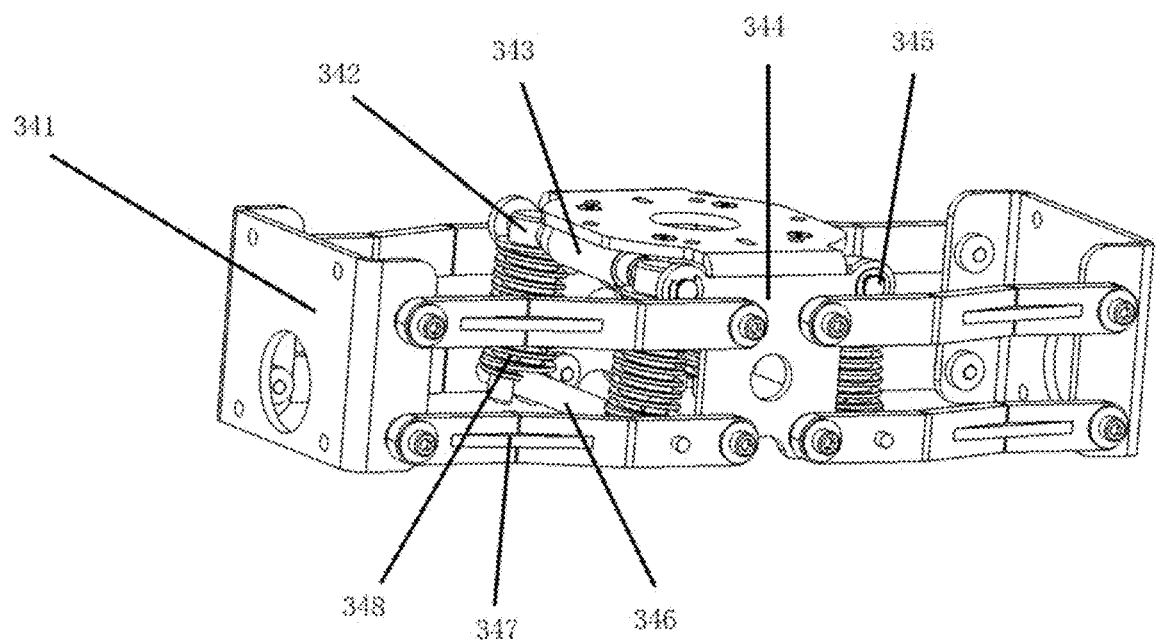
FIG. 5 is a schematic diagram of a planetary wheel set suspension structure according to an embodiment of the disclosure.
Figure 6A:
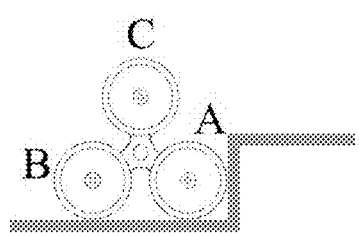
FIG. 6A to FIG. 6F are schematic diagrams of a main view of a planetary wheel set obstacle crossing process of the rear drive set according to an embodiment of the disclosure.
Figure 6B:
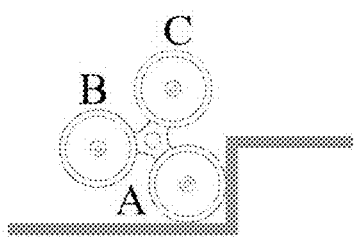
Figure 6C:
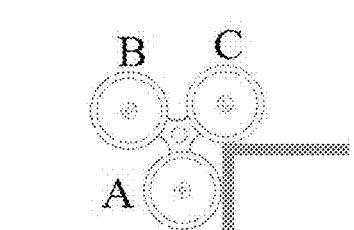
Figure 6D:
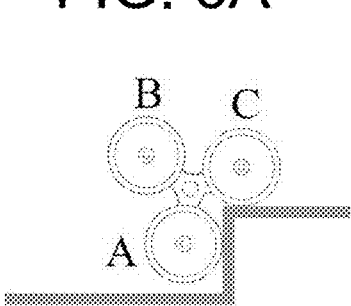
Figure 6E:
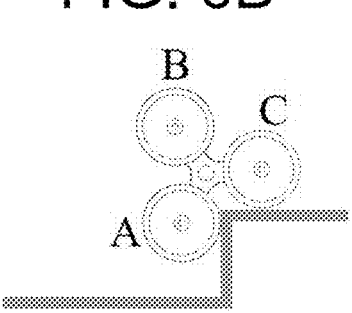
Figure 6F:
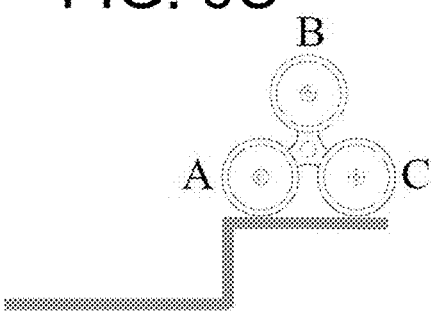
Figure 7A:
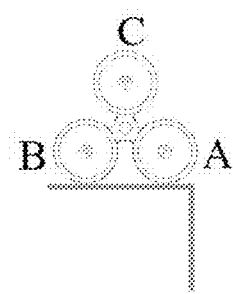
FIG. 7A to FIG. 7F are schematic diagrams of a main view of a planetary wheel set gully crossing process of the rear drive set according to an embodiment of the disclosure.
Figure 7B:
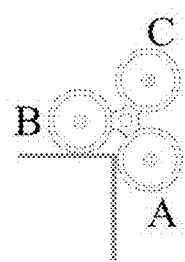
Figure 7C:
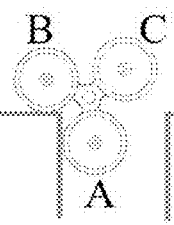
Figure 7D:
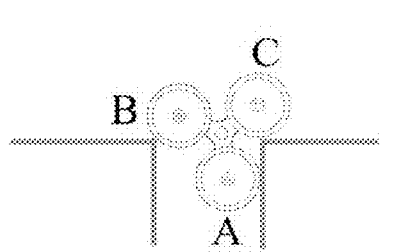
Figure 7E:
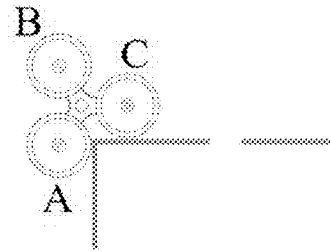
Figure 7F:
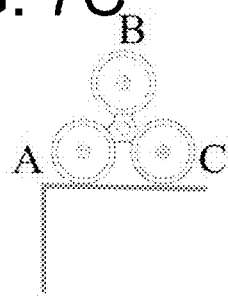

FIG. 5 is a schematic diagram of a planetary wheel set suspension structure according to an embodiment of the disclosure. As shown in FIG. 5, the planetary wheel set suspension structure 340 includes a motor bracket 341, a spring guide rod 342, a spacing sleeve 343, a drive bracket 344, a support shaft 345, a connecting rod 346, a pendulum rod 347, and a pressure spring 348. The motor bracket 342 is used to fix the drive device 320, and is connected to the drive bracket 344 through the four pendulum rods 347 to form a parallelogram structure, which can satisfy larger angular changes and improve terrain adaptability. The connecting rod 346 is connected between the two lower pendulum rods 347. The spring guide rod 342 passes through the pressure spring 348 and is connected to the drive bracket 344 through the support shaft 345. A fork is provided under the spring guide rod 342. The connecting rod 346 is placed in the fork. An upper end of the pressure spring 348 is pressed against the support shaft 345, and a lower end is pressed against the connecting rod 346. The spacing sleeve 343 is sleeved onto the support shaft 345 and is placed between the two spring guide rods 342 on the same side.

For ease of understanding, the front wheel 312, the rear wheel 313, and the upper wheel 311 in the planetary wheel set are replaced with a wheel A, a wheel B, and a wheel C here.

In a specific embodiment, please refer to FIG. 6A to FIG. 6F for an obstacle crossing process of the planetary wheel set structure 310. During normal travelling, please refer to FIG. 6A, the wheel A and the wheel B of the planetary wheel set structure 310 touch the ground at the same time. The wheel A and the wheel B provide stable power. When encountering an obstacle, please refer to FIG. 6B to FIG. 6F, the wheel A is blocked by the obstacle. Under the action of the driving torque output by the second drive device 320, the binding rod 314 flips forward around the wheel A, so that the wheel C touches the ground. An upward driving force generated by the wheel A and a driving force generated by the wheel C jointly act, so that the planetary wheel makes a combined flipping and forward movement, and the center of gravity gradually rises to complete obstacle crossing. At this time, if the obstacle has not been passed, the wheel C is blocked by the obstacle. Under the action of the driving torque output by the second drive device 320, the binding rod 314 flips forward around the wheel C, so that the wheel B touches the ground. The three wheels flip in turn until the entire wheel set passes the obstacle.

In a specific embodiment, please refer to FIG. 7A to FIG. 7F for a gully crossing process of the planetary wheel set structure 310. When the planetary wheel set structure 310 encounters a gully, the wheel A is pressed against a front wall of a deep groove under the action of the driving torque output by the second drive device 320. The planetary wheel set makes a combined forward and clockwise rotating movement. The center of the planetary wheel set is lowered. After the wheel C contacts a plane on an opposite side of the gully, the wheel B and the wheel C jointly drive the planetary wheel set to move horizontally. Due to the relative movement of a central axis of the planetary wheel set and the planetary wheel set, the wheel A separates from a front wall of the deep groove and abuts against a rear wall of the deep groove. During the process, the wheel B separates from a front plane of the deep groove. When the wheel A contacts the front wall of the gully, a generated upward driving force and a driving force generated by the wheel C jointly act, so that the planetary wheel makes a combined flipping and forward movement, and the center of gravity gradually rises to complete gully crossing.

It can be seen that during normal travelling, the two wheels of the planetary wheel set are contact the ground at the same time, so the turning characteristics are poor and the wear is more serious. Therefore, the dual-drive steering wheel structure is adopted by the front drive set, which as better turning characteristic as compared with the front drive set also having the planetary wheel set structure. Thus, the dual-drive steering wheel structure has excellent obstacle crossing performance and turning characteristics at the same time.

It is understandable that the obstacle crossing ability of a wheel type obstacle crossing robot is largely limited by the wheel diameter, while the obstacle crossing ability of the planetary wheel set is limited by a planetary bracket radius R and a planetary wheel radius r. Therefore, the design of the planetary bracket radius R and the planetary wheel radius r may be optimized according to actual application scenarios. All planetary bracket radii R and planetary wheel radii r are traversed and values are obtained. All feasible solutions are selected, filtered, and optimized according to the overall size. A total height of the planetary wheels is used as an optimization index to select a minimum total height, thereby optimizing the design of the planetary wheel set.

Figure 8:
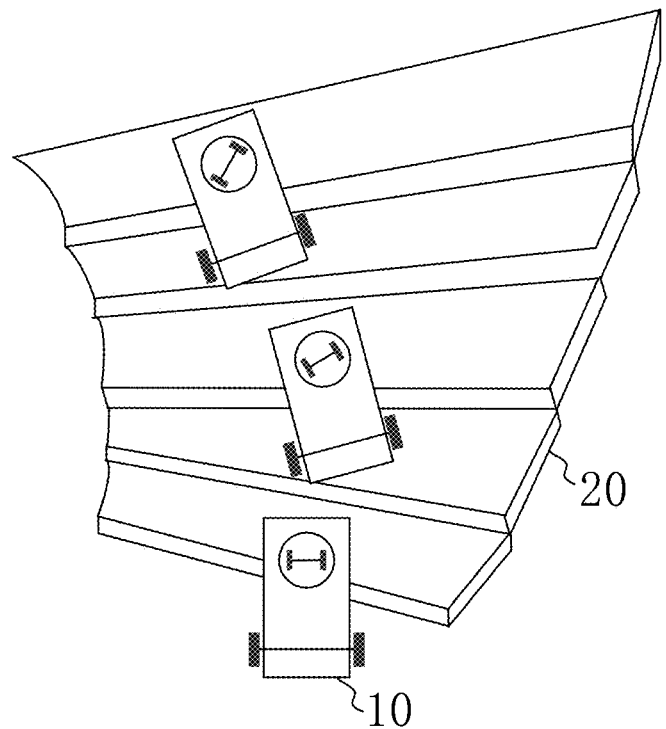
FIG. 8 is a schematic diagram of an obstacle crossing robot traveling on a spiral staircase according to an embodiment of the disclosure.

FIG. 8 is a schematic diagram of an obstacle crossing robot traveling on a spiral staircase according to an embodiment of the disclosure. As shown in FIG. 8, each level of step of a spiral staircase 20 is generally narrow on an inner side and wide on an outer side, and the smaller the turning radius, the greater the difference in width between the inner side and the outer side of each level of step, and the higher the requirements for the obstacle crossing performance and the turning characteristics of the obstacle crossing robot. When a planetary wheel type obstacle crossing robot 10 according to the disclosure climbs such staircase, the height difference between left and right wheels of the front and rear drive sets cannot be too large. In other words, if the left and right wheels are on different levels of steps, the robot is most likely to roll over due to severe tilting of the vehicle body. The rear drive set controls the output rotational speed of the motor, so that the left and right planetary wheel sets are on the same level of step. The front drive set, that is, the dual-drive steering wheel structure, is more flexible and can change to any angle for the front drive set to be on the same level of step, so that the left and right height of the vehicle body is basically unchanged. The drive sets on each level are independent of each other and are respectively controlled, so that the vehicle body will not be stuck due to inconsistent actions between the drive sets.

In the planetary wheel type obstacle crossing robot according to the disclosure, the front drive set has the dual-drive steering wheel structure. Under the premise that the rear drive set is on the same level of step, the front drive set can change to any angle, so that the front drive set is on the same level of step at the same time, which prevents a planetary wheel vehicle from rolling over and being stuck when crossing an obstacle, so that the obstacle crossing ability of the planetary wheel type obstacle crossing robot is greatly improved. In addition, the planetary wheel type obstacle crossing robot has a simple structure and good turning characteristics, which is conducive to the popularization and application of the planetary wheel type obstacle crossing robot.

Persons skilled in the art can easily understand that the above are only preferred embodiments of the disclosure and are not intended to limit the disclosure. Any modification, equivalent replacement, improvement, etc., made within the spirit and principle of the disclosure should all be included in the protection scope of the disclosure.

What is claimed is:

1. A planetary wheel type obstacle crossing robot, comprising:
a frame, a front drive set, and a rear drive set, wherein
the front drive set is connected to a front end of the frame, and the front drive set comprises a dual-drive steering wheel structure; the dual-drive steering wheel structure comprises two drive wheels and two first drive devices, the two first drive devices respectively output different rotational speeds to the two drive wheels, so that the dual-drive steering wheel structure is steered to drive the frame and the rear drive set to steer;
the rear drive set is connected to a rear end of the frame, and the rear drive set comprises two planetary wheel sets, two second drive devices, and a planetary wheel set suspension structure, and each planetary wheel set is individually driven;
each planetary wheel set comprises a front wheel, a rear wheel, and an upper wheel, the three wheels of each planetary wheel set cooperate to climb over an obstacle under an action of a driving torque output by the second drive device, and the two second drive devices respectively control rotational speeds of the two planetary wheel sets to implement steering of the two planetary wheel sets; the two planetary wheel sets are connected through the planetary wheel set suspension structure, the planetary wheel set suspension structure is a retractable parallelogram structure, two vertical sides of the parallelogram structure are perpendicular to a ground, other two sides are parallel to the ground, the other two sides adapt to a terrain to retract, and the two planetary wheel sets are symmetrically connected to the two vertical sides of the parallelogram structure, so that the two planetary wheel sets always remain in a vertical state and adapt to a non-planar terrain; and the obstacle crossing robot is driven by the front drive set and the rear drive set to cross the obstacle and steers, wherein the rear drive set further comprises a drive support plate;

the two planetary wheel sets are respectively connected to one side of the two second drive devices;

other sides of the two second drive devices are respectively connected to two sides of the planetary wheel set suspension structure;

an upper end of the planetary wheel set suspension structure is connected to a lower end of the drive support plate; and an upper end of the drive support plate is connected to the rear end of the frame.

2. The planetary wheel type obstacle crossing robot according to claim 1, wherein the front drive set further comprises a steering wheel suspension structure;

the dual-drive steering wheel structure is connected to the front end of the frame through the steering wheel suspension structure;

the steering wheel suspension structure comprises a drive part fixing plate, a damping spring, and a damping spring bracket;

the dual-drive steering wheel structure further comprises a motor fixing base, a drive wheel fixing plate, an outer connecting shaft, a limit sleeve, an inner connecting shaft, and a shaft end retaining ring; and the first drive device is connected to the motor fixing base, and a torque output by the first drive device is transmitted to the drive wheel through a belt transmission structure or a chain transmission structure; the drive wheel is connected to an output shaft of the belt transmission structure or the chain transmission structure, and the drive wheel fixing plate passes through the output shaft and connects the output shaft and the drive wheel through a bolt to implement fixing in an axial direction of the drive wheel; the outer connecting shaft is connected to the drive part fixing plate through a bolt, the inner connecting shaft passes through the outer connecting shaft, a lower end of the outer connecting shaft is connected to the motor fixing base, and an upper end of the inner connecting shaft is connected to the shaft end retaining ring, thereby implementing relative rotation of the inner connecting shaft and the outer connecting shaft; the limit sleeve passes through the inner connecting shaft, the shaft end retaining ring is screwed onto a thread of the upper end of the inner connecting shaft, and the limit sleeve is pressed against the inner connecting shaft to implement axial direction limit; and two ends of the damping spring are respectively pressed against the inner connecting shaft and a lower end of the damping spring bracket, and an upper end of the damping spring bracket is connected to the front end of the frame.

3. The planetary wheel type obstacle crossing robot according to claim 1, wherein the front drive set has a center-symmetric structure.

4. The planetary wheel type obstacle crossing robot according to claim 1, wherein the planetary wheel set suspension structure comprises two motor brackets, eight pendulum rods, two connecting rods, a drive bracket, four spring guide rods, four pressure springs, two spacing sleeves, and two support shafts;

the two motor brackets are used to respectively connect to the second drive device;

the two motor brackets are respectively connected to the drive bracket through the four pendulum rods to form the retractable parallelogram structure; the four pendulum rods are respectively composed of two pendulum rods with parallel upper ends and two pendulum rods with parallel lower ends; and the connecting rod is connected between the two pendulum rods with parallel lower ends;

an upper end of the pressure spring is pressed against the support shaft, and a lower end is pressed against the connecting rod; the spring guide rod passes through the pressure spring and is connected to the drive bracket through the support shaft, a fork is provided under the spring guide rod, and the connecting rod is placed in the fork; and two sides of the drive bracket respectively have two spring guide rods, two pressure springs, a spacing sleeve, and a support shaft;

the spacing sleeve is sleeved onto the support shaft and is placed between the two spring guide rods on a same side; and when the planetary wheel set encounters the obstacle or a ground with uneven left and right sides, a shape of a parallelogram formed by the motor bracket, the drive bracket, and the pendulum rod changes; the planetary wheel set and the second drive device rely on the pendulum rod to swing together, the connecting rod squeezes the pressure spring to move in the fork under the spring guide rod, and at a same time, the spring guide rod rotates around the support shaft, thereby enhancing terrain adaptability of the obstacle crossing robot.

5. The planetary wheel type obstacle crossing robot according to claim 1, wherein each planetary wheel set further comprises a binding rod;

the binding rod has three output shafts, and movement directions and movement speeds of the three output shafts are the same; and the three output shafts are respectively connected to the front wheel, the rear wheel, and the upper wheel; and a central axis of the upper wheel, a central axis of the front wheel, and a central axis of the rear wheel respectively coincide with central axes of the three output shafts of the binding rod, and structures of the upper wheel, the front wheel, and the rear wheel are the same; and a geometric center of the upper wheel, a geometric center of the front wheel, and a geometric center of the rear wheel are respectively located at three vertices of a same equilateral triangle.

6. The planetary wheel type obstacle crossing robot according to claim 5, wherein when the obstacle crossing robot is traveling normally, the front wheel and the rear wheel of the planetary wheel set are on the ground at a same time, and stable power is provided through the front wheel and the rear wheel; and when the obstacle crossing robot encounters the obstacle, the front wheel is blocked by the obstacle, under the action of the driving torque output by the second drive device, the binding rod flips forward around the front wheel, so that the upper wheel touches the ground, at this time, if the obstacle has not been passed, the upper wheel is also blocked by the obstacle, under the action of the driving torque output by the second drive device, the binding rod continues to flip forward around the upper wheel, so that the rear wheel touches the ground, and the three wheels flip in turn until the entire planetary wheel set passes the obstacle.

7. The planetary wheel type obstacle crossing robot according to claim 5, wherein when the obstacle crossing robot encounters a gully, the front wheel is under the action of the driving torque output by the second drive device, and the binding rod flips forward around the front wheel, so that the upper wheel reaches an opposite side of the gully, after the upper wheel contacts a plane on the opposite side of gully, the upper wheel and the rear wheel jointly drive the planetary wheel set to move horizontally, the front wheel separates from a front wall of the gully, an upward driving force generated by the front wheel contacting the front wall of the deep groove and a driving force generated by the upper wheel jointly act, so that the planetary wheel set makes a combined flipping and forward movement, and a center of gravity gradually rises to complete gully crossing.

8. The planetary wheel type obstacle crossing robot according to claim 1, wherein the rear drive set has a center-symmetric structure.

9. The planetary wheel type obstacle crossing robot according to claim 2, wherein the front drive set has a center-symmetric structure.

10. The planetary wheel type obstacle crossing robot according to claim 6, wherein when the obstacle crossing robot encounters a gully, the front wheel is under the action of the driving torque output by the second drive device, and the binding rod flips forward around the front wheel, so that the upper wheel reaches an opposite side of the gully, after the upper wheel contacts a plane on the opposite side of the gully, the upper wheel and the rear wheel jointly drive the planetary wheel set to move horizontally, the front wheel separates from a front wall of the gully, an upward driving force generated by the front wheel contacting the front wall of the deep groove and a driving force generated by the upper wheel jointly act, so that the planetary wheel set makes a combined flipping and forward movement, and a center of gravity gradually rises to complete gully crossing.

11. The planetary wheel type obstacle crossing robot according to claim 4, wherein the rear drive set has a center-symmetric structure.

* * * * *